US009913152B2

(12) United States Patent
Abadi et al.

(10) Patent No.: US 9,913,152 B2
(45) Date of Patent: Mar. 6, 2018

(54) OPTIMIZING DISCOVERY OF HIGH RESOURCES CONSUMING WIRELESS NETWORK RESOURCE WITHIN A GROUP OF MOBILE COMMUNICATION DEVICES

(71) Applicant: International Business Machines Corporation, Armonk, NY (US)

(72) Inventors: Aharon Abadi, Petach Tikva (IL); Nili Guy-Ifergan, Haifa (IL); Yossi Mesika, Afula (IL); Oleg Sternberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 14/948,403

(22) Filed: Nov. 23, 2015

(65) Prior Publication Data

US 2017/0150374 A1 May 25, 2017

(51) Int. Cl.
H04W 24/02 (2009.01)
H04W 48/16 (2009.01)
H04W 24/08 (2009.01)

(52) U.S. Cl.
CPC ........... *H04W 24/02* (2013.01); *H04W 48/16* (2013.01); *H04W 24/08* (2013.01)

(58) Field of Classification Search
CPC ...... H04W 24/02; H04W 24/08; H04W 48/16
See application file for complete search history.

(56) References Cited

U.S. PATENT DOCUMENTS

| 8,606,265 B2 | 12/2013 | Ekici et al. |
| 8,880,047 B2 | 11/2014 | Konicek et al. |
| 9,001,693 B2 | 4/2015 | Abraham et al. |
| 9,078,121 B2 | 7/2015 | Georgescu et al. |

(Continued)

FOREIGN PATENT DOCUMENTS

| GB | 2483090 | 2/2012 |
| WO | 2014182377 | 11/2014 |

OTHER PUBLICATIONS

Hongseok Yoo et al., "Traffic-aware parameter tuning for Wi-Fi direct power saving", Ubiquitous and Future Networks (ICUFN), 2014 Sixth International Conf on Date of Conference: Jul. 8-11, 2014, pp. 479-480.

*Primary Examiner* — Min Jung

(57) ABSTRACT

A discovering master communication device for discovering high resources consuming wireless network resources to optimize resources consumption during network discovery session(s) within a group of nearby communication devices, comprising:

a first interface for communicating with remote site(s) over high resources consuming wireless network(s), a second interface for communicating with nearby device (s) which include similar first interface and located within range of the second interface. For a similar communication session, resources consumption of the second interface is lower compared to the first interface, and processor(s) executing a stored code for activating the first interface to discover availability of high resources consuming wireless network resource(s) with assistance of the nearby device(s), sending availability message to the nearby device(s) over the second interface, and sending master assignment message to one of the nearby device(s) over the second interface.

17 Claims, 6 Drawing Sheets

(56) References Cited

U.S. PATENT DOCUMENTS

2005/0075084 A1* 4/2005 Salokannel ............. H04L 45/00
                                                                     455/126
2017/0150374 A1* 5/2017 Abadi .................... H04W 24/02

* cited by examiner

OPTIMIZING DISCOVERY OF HIGH RESOURCES CONSUMING WIRELESS NETWORK RESOURCE WITHIN A GROUP OF MOBILE COMMUNICATION DEVICES

FIELD AND BACKGROUND OF THE INVENTION

The present invention, in some embodiments thereof, relates to optimizing discovery of a high resources consuming wireless network resource for a group of mobile communication devices, and, more specifically, to optimizing resources consumption during discovery of a high resources consuming wireless network resource within a group of mobile communication devices.

Availability and distribution of mobile wireless network-enabled devices is rapidly increasing. The wireless network-enabled devices such as, for example, a mobile phone, a tablet, a laptop, a smart watch, a wearable device and the likes are mostly battery powered and hence may have a limited battery capacity, i.e. having limited battery energy and/or battery power. In addition the mobile wireless network-enabled device(s) may have limited processing and/or computation resources. The mobile wireless network-enabled device(s) may support communication over one or more high resources consuming wireless networks such as, for example, wireless local area network (WLAN) also known as Wi-Fi, Worldwide Interoperability for Microwave Access (WiMAX), cellular network and the likes. In addition to the ability to connect to the one or more high resources consuming wireless networks, two or more of the mobile wireless network-enabled devices may share another one or more low resources consuming communication links. The low resources consuming communication links may be, for example, Bluetooth low energy (BLE also known as Bluetooth smart), Bluetooth, near field communication (NFC), infra-red (IR), ZigBee and/or Z-Wave.

Constant connection of the one or more network-enabled devices to the one or more high resources consuming wireless networks, and specifically, a network discovery session in which the network-enabled device(s) discovers and/or resolves availability of a network connection to the one or more global networks and/or one or more remote network resources may involve high resources consumption. Moreover, a scenario in which the network-enabled device(s) are trying to discover availability of the high resources consuming wireless network(s) in a location where there is no coverage for the high resources consuming wireless network(s) may result in excessive battery energy consumption. Unless the high resources consuming wireless network interface of the network-enabled device(s) is manually turned off the network-enabled device(s) may try to automatically discover the high resources consuming wireless network(s) over and over again to no avail.

SUMMARY OF THE INVENTION

According to some embodiments of the present invention there are provided a discovering master communication device for discovering a high resources consuming wireless network resource in order to optimize resources consumption of a group of nearby communication devices. The discovering master communication device comprises of a first communication interface for communicating with one or more of a plurality of remote sites over one or more of a plurality of high resources consuming wireless networks, a second communication interface connecting to a low resources consuming communication link to communicate with a group of one or more nearby communication devices which are located within range of the second communication interface, the one or more nearby communication devices include the first communication interface, a storage for storing a code and one or more processors coupled to the first communication interface, the second communication interface and the storage to execute the code. The code comprises code instructions to activate the first communication interface to discover an availability of the one or more high resources consuming wireless network resource, wherein the discovering master to communication device is assisted by the one or more nearby communication devices for the availability discovery, code instructions to send an availability message to the one or more nearby communication devices over the second communication interface to inform of the availability and code instructions to send a master assignment message to one of the one or more nearby communication devices over the second communication interface to dynamically assign one of the one or more nearby communication devices as a new discovering master communication device. Wherein for a similar communication session, resources consumption of the second communication interface is lower than resources consumption of the first communication interface.

Optionally, the one or more nearby communication devices activate a deactivated first communication interface thereof following reception of the availability message in order to connect to the available one or more high resources consuming wireless networks.

Optionally, the code comprises code instructions to perform a resources analysis of availability of one or more of a plurality of resources of the discovering master and the one or more nearby communication device. The dynamic assignment is based on the resources analysis. The resources analysis includes computation of an availability of one or more resources for the discovering master and the one or more nearby communication devices. The one or more resources is a member of a group consisting of: battery energy, battery life expectancy, processing load, processing time, execution time, a valid communication package, a valid service provider package and sufficient network bandwidth.

Optionally, the code comprises code instructions to deactivate the first communication interface of the discovering master communication device following a no coverage indication that the discovering master communication device is located in a no coverage area of said at least one high resources consuming wireless network.

Optionally, the no coverage indication originates from one or more of a plurality of sensors accessible by one or more of: the discovering master communication device and the one or more nearby communication device assisting the discovering master communication device. The one or more sensors is a member of a group consisting of: a global positioning system (GPS) sensor, an accelerometer sensor and a gyroscope sensor.

Optionally, the no coverage indication originates from an analysis of one or more of a plurality of calendric information records available to one or more of: the discovering master communication device and the one or more nearby communication device assisting the discovering master communication device.

Optionally, the no coverage indication originates from another one of the plurality of high resources consuming wireless networks available to at one or more of: the discovering master communication device and the one or more nearby communication device assisting the discovering master communication device.

Optionally, the new discovering master communication device is assigned following detection that the discovering master communication device is unavailable over the low resources consuming communication link.

Optionally, another one or more nearby communication device join the group by connecting to the low resources consuming communication link.

According to some embodiments of the present invention there are provided systems and methods for discovering a high resources consuming wireless network resource in order to optimize resources consumption of a group of nearby communication devices. The computer implemented uses an application code executed on a discovering master communication device. The application code activates a first communication interface of the discovering master communication device to discover availability of one or more of a plurality of high resources consuming wireless network resources, send an availability message over the second communication interface to the one or more nearby communication device which include the first communication interface and are in range of the second communication interface to inform the one or more nearby communication device of the availability and send a master assignment message to the one or more nearby communication devices over the second communication interface to dynamically assign one of the one or more nearby communication devices as a new discovering master communication device. The discovering master communication device is assisted by a group of one or more nearby communication device for the availability discovery. For a similar communication session, resources consumption of the second communication interface is lower than resources consumption of the first communication interface.

Optionally, the one or more nearby communication device activate a deactivated first communication interface thereof following reception of the availability message in order to connect to the one or more high resources consuming wireless networks.

Optionally, the code comprises code instructions to perform a resources analysis of availability of one or more of a plurality of resources of the discovering master communication device and the one or more nearby communication device. The dynamic assignment is based on the resources analysis. The resources analysis includes computation of an availability of one or more resource for the discovering master and the one or more nearby communication device. The one or more resource is a member of a group consisting of: battery energy, battery life expectancy, processing load, processing time, execution time, a valid communication package, a valid service provider package, and sufficient network bandwidth.

Optionally, the code comprises code instructions to deactivate the first communication interface of the discovering master communication device following an indication that the discovering master communication device is located in a no coverage area of the one or more high resources consuming wireless networks.

Optionally, the no coverage indication originates from one or more indicating devices having accessibility to one or more indication sources. The indicating device is the discovering master communication device and/or the one or more nearby communication device assisting the discovering master communication device. The no coverage indication source is a member selected from a group consisting of: one or more of a plurality of sensors, calendric information analysis and an indication from another one of the plurality of high resources consuming wireless networks.

Optionally, the code comprises code instructions to dynamically assign the new discovering master communication device following detection that the discovering master communication device is unavailable over the low resources consuming communication link.

According to some embodiments of the present invention there is provided a software program product for discovering a high resources consuming wireless network resource in order to optimize resources consumption of a group of nearby communication devices. The software program product is stored in a non-transitory computer readable storage medium and includes:

First program instructions to activate a first communication interface of a discovering master communication device to discover an availability of one or more of a plurality of high resources consuming wireless network resources. The discovering master communication device is assisted by a group of one or more nearby communication device for said availability discovery.

Second program instructions to send an availability message to the one or more nearby communication device which includes the first communication interface to inform the one or more nearby communication devices of the availability. The availability message is sent over a second communication interface of the discovering master communication device while the one or more nearby communication devices are located within range of the second communication interface.

Third program instructions to send a master assignment message to one of the one or more nearby communication device over the second communication interface to dynamically assign one of the one or more nearby communication device as a new discovering master communication device.

For a similar communication session, resources consumption of the second communication interface is lower than resources consumption of the first communication interface. The first, second and third program instructions are executed by one or more computerized processors from the non-transitory computer readable storage medium.

Optionally, the one or more nearby communication devices activate a deactivated said first interface thereof following reception of the availability message in order to connect to the one or more high resources consuming wireless network.

Optionally, the software program product comprises fourth program instructions to perform a resources analysis of resources availability of the discovering master and the one or more nearby communication device. The dynamic assignment is based on the resources analysis. The resources analysis includes computation of an availability of one or more resources for the discovering master and the one or more nearby communication device. The one or more resources is a member of a group consisting of: available battery energy, battery life expectancy, processing load, processing time, execution time, a valid communication package, a valid service provider package and sufficient network bandwidth. The fourth program instructions are executed by the one or more computerized processors from the non-transitory computer readable storage medium.

Optionally, the software program product comprises fifth program instructions to deactivate the first communication interface of the discovering master communication device following a no coverage indication that the discovering master communication device is located in a no coverage area of the one or more high resources consuming wireless networks. The fifth program instructions are executed by the one or more computerized processors from the non-transitory computer readable storage medium.

Optionally, the no coverage indication originates from one or more indicating device having accessibility to one or more indication sources. The indicating device is the discovering master communication device and/or one of the nearby communication devices assisting the discovering master communication device. The no coverage indication source is a member selected from a group consisting of: one or more of a plurality of sensors, calendric information analysis and an indication from another one of the plurality of high resources consuming wireless networks.

Optionally, the software program product comprises sixth program instructions to dynamically assign the new discovering master communication device following detection that the discovering master communication device is unavailable over the low resources consuming communication link. The sixth program instructions are executed by the one or more computerized processors from the non-transitory computer readable storage medium.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 5:
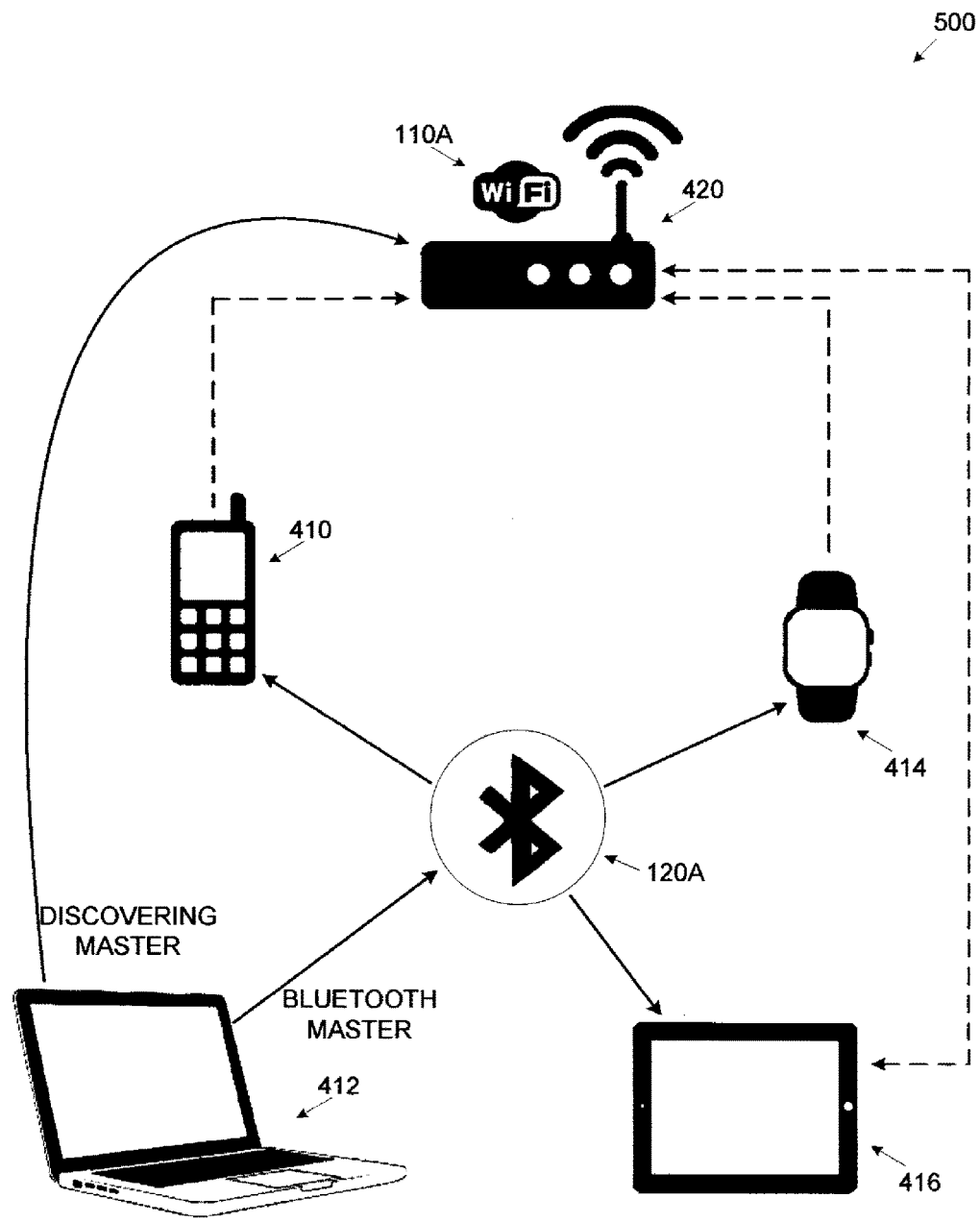
Figure 6:
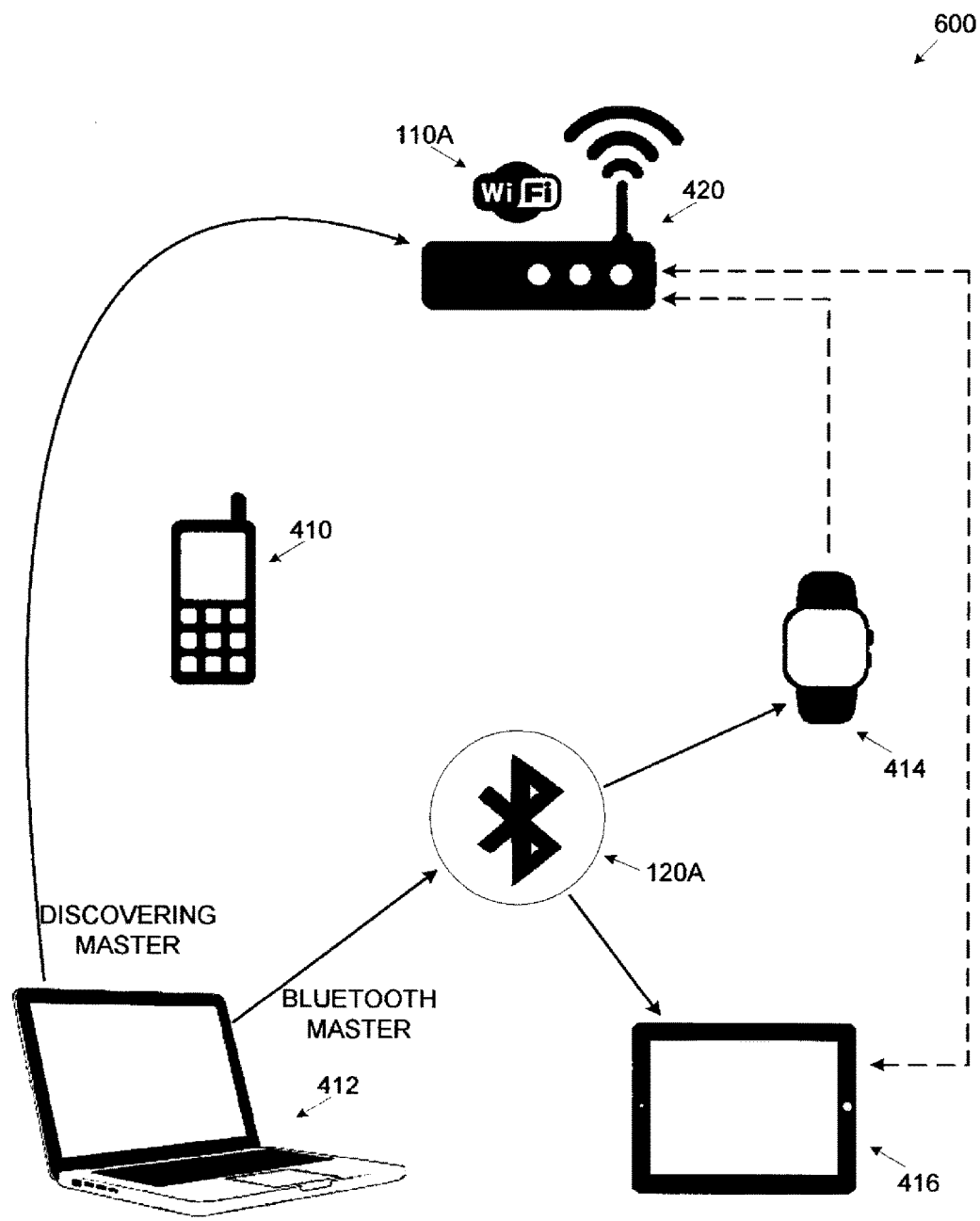

FIG. 5 is a schematic illustration of an exemplary system for assigning a new discovering master communication device in an exemplary Wi-Fi network following a resources analysis, according to some embodiments of the present invention; and FIG. 6 is a schematic illustration of an exemplary system for assigning a new discovering master communication device in an exemplary Wi-Fi network following unavailability of a discovering master communication device, according to some embodiments of the present invention.

DESCRIPTION OF SPECIFIC EMBODIMENTS OF THE INVENTION

The present invention, in some embodiments thereof, relates to optimizing discovery of a high resources consuming wireless network resource within a group of mobile communication devices, and, more specifically, to optimizing resources consumption during discovery of a high resources consuming wireless network resources within a group of mobile communication devices by dynamically assigning a discovering master communication device.

The term high resources consuming wireless network resource in the context of the present invention relates to a high resources consuming wireless network and/or a remote resource which is accessible over a high resources consuming wireless network. The high resources consuming wireless network may be a wide area network (WAN) which utilizes an infrastructure to allow communication with remote sites and/or devices through a networking infrastructure. The WAN may utilize one or more wireless networks, for example, a wireless network connecting to the internet, a cellular network, a WiMAX and the likes. Specifically, in the context of the present invention, a wireless local area network (WLAN) may be may considered a high resources consuming wireless network resource as it allows connection to a WAN through a local infrastructure, for example, a base station, an access point, a switch, a router and the likes. The cellular network may include one or more cellular networks, such as, for example, a global system for mobile communications (GSM) network, a code division multiple access (CDMA) network and/or a long-term evolution (LTE) network. As stated, the high resources consuming wireless network resource may refer to either availability of the high resources consuming wireless network itself and/or to availability of one or more remote resources which are accessible over the high resources consuming wireless network, for example, a database, a storage, a web site, a printer and the likes. Communication over the high resources consuming wireless network is considered as high resources consuming. A low resources consuming communication link as opposed to the high resources consuming wireless network is a communication link which is a low resources consumer and is used for communication among two or more nearby communication devices through, for example, an ad-hoc connection, a network infrastructure and/or a peer-to-peer connection between two or more communication devices. The low resources consumption of the low resources consuming communication link may be absolute and/or relative to the high resources consuming wireless network. The low resources consuming communication link may include, for example, BLE, Bluetooth, NFC, IR, ZigBee and/or Z-Wave. Optionally, the low resources consuming communication link may be utilized through a wired connection and/or protocol between two or more communication devices, for example, universal serial bus (USB), Ethernet and/or token ring. Communication over the low resources consuming communication link is considered as low energy and/or power consuming. Resources consumption for communicating over the high resources consuming wireless network and/or the low resources consuming communication link are very much application dependent. However, for a given communication session involving a given bandwidth and/or throughput, energy consumption for example, of communication over the low resources consuming communication link may be as low as 2% compared to communication over the high resources consuming wireless network. Optionally, a WLAN for example may be considered a low resources consuming communication when discovering availability of higher (relative to the WLAN) resources consuming wireless network resource(s) such as, for example, a cellular network and/or a remote resource which is accessible over a cellular network.

The term resources in the context of optimizing resources during the discovery process of a high resources consuming network resource may refer to optimizing one or more resources of the group of mobile communication devices such as, for example, energy, power, battery life, processing load, processing time, execution time and the likes. Optionally, resources include network service availability, for example a valid communication package, a valid service provider package, sufficient network bandwidth and the likes.

According to some embodiments of the present invention, there are provided devices, systems, methods and computer program products for optimizing resources consumption during discovery of a high resources consuming wireless network resource for a group of mobile communication by dynamically assigning a discovering master communication device. In a scenario where two or more network-enabled communication devices are located nearby and the two or more nearby communication devices share at least some common networking capabilities a network a high resources consuming wireless network discovery session may be initiated with assigning discovering master communication device. The discovery sequence as described herein aims to optimize power consumption of the two or more communication devices which try to access a common high resources consuming wireless network resource. The common networking capabilities allow the two or more communication devices to connect to one or more common high resources consuming wireless network resources and to one or more common low resources consuming communication link. As discussed hereinabove, the high resources consuming wireless network resource may refer to availability of the high resources consuming wireless network itself and/or to availability of one or more remote resources which are accessible over the high resources consuming wireless network. However, for brevity, throughout this invention reference is made to discovery of the high resources consuming wireless network itself but is not limiting in any way. Communication between the two or more nearby communication devices is done over the one or more common low resources consuming communication links which are naturally low resources consuming links compared to communication over the high resources consuming wireless networks. The discovering master communication device may enable one or more interfaces in order to discover an available one or more of the high resources consuming wireless networks such as, for example, a WLAN, a Wi-Fi, a cellular network, a WiMAX and the likes. Methods, sequences and/or algorithms for discovering the one or more high resources consuming wireless networks by the discovering master communication device is performed as known in the art and is beyond the scope of this invention.

During the discovery process the high resources consuming wireless interfaces of the one or more nearby communication device(s) are disabled to, for example, preserve battery energy and/or reduce processing load. In the event the discovery process resolves that one or more of the high resources consuming wireless networks are available the discovering master communication device establishes a connection with the available high resources consuming wireless network(s) and sends an availability message to notify one or more of the nearby communication devices of the availability. The availability message is sent by the discovering master communication device to the nearby communication device(s) over the low resources consuming communication link, for example, BLE, Bluetooth, NFC, IR, ZigBee and/or Z-Wave. Once the availability message is received by the nearby communication device(s) they may enable corresponding high resources consuming wireless interface(s) to connect to the available high resources consuming wireless network(s). The discovering master may be assisted by the nearby communication device(s) for discovering the availability of the high resources consuming wireless resource(s). The assistance may be in the form of, for example, providing sensory data and/or calendric data retrieved from calendric data records. In case no high resources consuming wireless network was discovered, the discovering master communication device may initiate additional network discovery sessions. Optionally, a time interval may be set between successive network resources discovery sessions during which the high resources consuming wireless interface of the discovering master communication device is turned off to, for example, preserve battery energy and/or reduce processing load. The discovering master communication device may transfer the role of network discovery to one of the other one or more nearby communication devices by sending a master assignment message. Assigning the role of network discovery from the current discovering master communication device to one of the nearby communication devices may be done by employing one of a plurality of dynamic network master assignment methods, for example, random assignment and/or token ring assignment. Assigning the role of network discovery may be performed by the discovering master communication device itself or by one of the other nearby communication devices, i.e. the discovering master communication device may not necessarily be responsible for assigning the role of network discovery. Transferring the role of network discovery and assigning it to one of the nearby communications devices may be done based on an analysis of availability of one or more resources such as, for example, battery energy, battery power, battery life, processing load, processing time, execution time, valid communication package, a valid service provider package, sufficient network bandwidth and the likes for each of the nearby communications device(s). Optionally, the resources analysis may compute the impact of enabling the one or more high resources consuming wireless interfaces on one or more of the resources and/or impact of other task(s) performed by each of the nearby communications device(s) on one or more of the resources. Optionally, the resources analysis determines the network availability, for example, a valid communication package, a valid service provider package and/or sufficient network bandwidth for the one or more nearby communication devices. As described above the resources analysis may be performed by any of the nearby communications device(s) and not necessarily by the discovery master communication device. The resources analysis may be performed individually by each of the nearby communications device(s) and the results transferred to one of the nearby communications device(s) for final decision for assigning the network discovery role.

Optionally, at an event the discovering master communication device is not detected, not available and/or not properly responding on the low resources consuming communication link, a new discovering master communication device is assigned.

Optionally, one or more additional network-enabled nearby communication devices may pair and/or connect to the low resources consuming communication link and join the high resources consuming wireless network discovery session.

Optionally, the discovering master communication device disables its one or more high resources consuming wireless interfaces and avoids the network discovery session following an indication that the discovering master communication device is located in a no coverage area of the one or more high resources consuming wireless networks. The indication may originate from an indicating device which may be the discovering master communication device itself and/or received from one or more of the nearby communication devices which may use one or more of their integrated capabilities to assist the discovering master communication device in the network discovery session, for example, sensory data and/or calendric data. I.e. one or more of the nearby communication devices may assist the discovering master communication device to identify a no coverage area condition.

Optionally, the network no coverage indication source is an input from one or more sensors, for example, a global positioning system (GPS) sensor, an accelerometer sensor and/or a gyroscope sensor which may be accessible from the discovering master communication device and/or from one or more of the nearby communication devices.

Optionally, the network no coverage indication source is the result of an analysis performed over calendric information available from one or more data records and/or software application residing on the discovering master communication device and/or one or more of the nearby communication devices. The data records may include, for example, information relating to the location of the person associated with the one or more communication devices at a certain time and date. Network coverage information relating to the determined no coverage location may be retrieved from one or more remote locations such as, for example, a remote server and/or a remote database over the one or more high resources consuming wireless networks (while still in network coverage area) and/or from past experience relating to trying to discover the one or more high resources consuming wireless networks at the determined location in the past.

Optionally, the indication source for the network no coverage indication for a specific one of the one or more high resources consuming wireless networks is received from the one or more remote locations over a different one or more of the high resources consuming wireless networks. For example, information of no Wi-Fi availability (no coverage) may be received by the discovering master communication device and/or one or more of the nearby communication devices over one or more of the cellular networks, such as, for example, a GSM network, a CDMA network and/or an LTE network.

While it may desirable to have the one or more network-enabled devices constantly connected to the one or more high resources consuming wireless networks, resources consumption may be greatly reduced by optimizing the network discovery session to be handled by the single discovering master communication device while the high resources consuming high resources consuming wireless interfaces of the one or more nearby communication devices is disabled (not consuming energy for example). Furthermore, the optimized network discovery session may allow for a more balanced and/or more efficient resources consumption management among the two or more communication devices since the role of network discovery may be dynamically re-assigned at any given time to the communication device currently presenting the highest availability of one or more of the resources, for example, longest battery life expectancy, highest battery energy (power) level and/or lower processing load. Moreover, completely disabling the high resources consuming wireless interfaces of all the communication devices in the event they are located in a no coverage area may serve for even higher resources saving by avoiding the redundant process for discovering the one or more high resources consuming wireless networks in a location where they are not available. The fact that the one or more nearby communication devices may support the master discovering communication device in detecting the network no coverage area may further expand the awareness of the master discovering communication device to such network no coverage areas.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
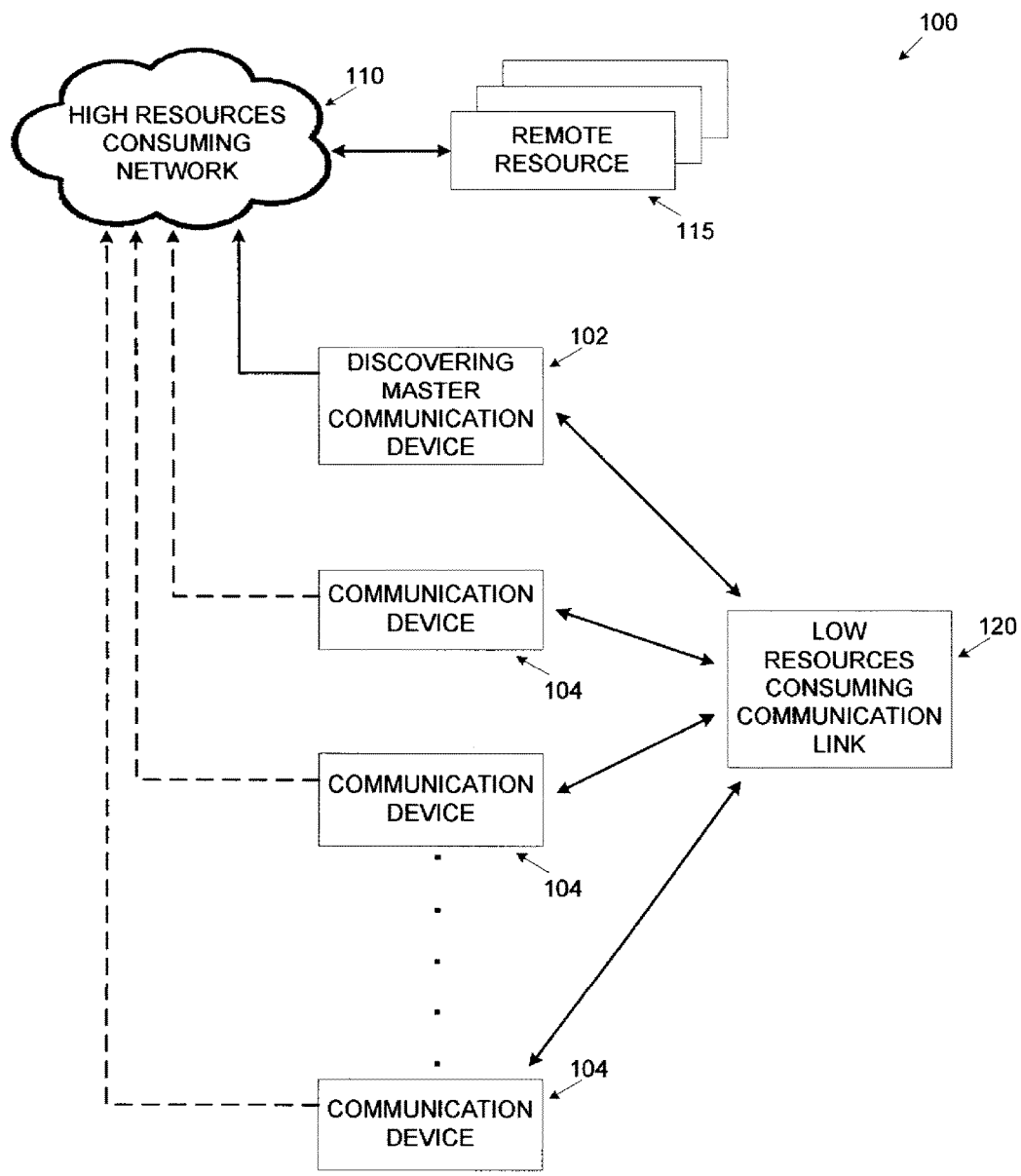
FIG. 1 is a schematic illustration of an exemplary system for optimizing discovery of a high resources consuming wireless network resource by dynamically assigning a discovering master communication device, according to some embodiments of the present invention.

Reference is now made to FIG. 1 which is schematic illustration of an exemplary system for optimizing discovery of a high resources consuming wireless network resource by dynamically assigning a discovering master communication device, according to some embodiments of the present invention. A system 100 includes a discovering master communication device 102 and one or more nearby communication devices 104 which have networking capabilities allowing them to connect to one or more high resources consuming wireless networks 110 and to one or more common low resources consuming communication links 120. The discovering master communication device 102 and one or more nearby communication devices 104 may be mobile communication devices such as, for example, a mobile phone, a tablet, a laptop, a smart watch, wearable devices and the likes. Over the one or more high resources consuming wireless networks 110, the discovering master communication device 102 and one or more nearby communication devices 104 may access one or more of a plurality of remote resources 115 such as, for example, a database, a storage, a web site, a printer and the likes.

The discovering master communication device 102 enables a first communication interface which is a high resources consuming wireless interface to start a network discovery session to discover the high resources consuming wireless network 110 and/or availability of one or more of the remote resources 115. At the detection of availability of the high resources consuming wireless network 110 and/or one of the remote resources 115, the discovering master communication device 102 establishes connection with the high resources consuming wireless network 110. The discovering master communication device 102 may be assisted by one or more of the nearby communication devices 104 for discovering the availability of the high resources consuming wireless network 110 and/or availability of one or more of the remote resources 115. The assistance may be in the form of, for example, providing sensory data and/or calendric data retrieved from calendric data records. Once the connection with the high resources consuming wireless network 110 is established, the discovering master communication device 102 sends one or more of the nearby communication devices 104 a availability massage over the low resources consuming communication link 120 to inform them that the high resources consuming wireless network 110 is available and they may try to connect to it. The discovering master communication device 102 connects to the low resources consuming communication link 120 through a second communication interface which may be a local communication interface. Following reception of the availability massage, each of the nearby communication devices 104 may try to discover, resolve and/or establish connection with the high resources consuming wireless network 110. When the high resources consuming wireless network 110 is not discovered, the discovering master communication device 102 may initiate additional network discovery sessions. Optionally, a time interval may be set between successive network discovery sessions during which the high resources consuming wireless interface of the discovering master communication device is turned off to preserve battery energy and/or processing resources. In case the connection with the high resources consuming wireless network 110 is lost the sequence to discover the high resources consuming wireless network 110 is repeated. However at any time during the sequence to discover the high resources consuming wireless network 110 a discovering master assignment process may be executed for assigning the role of network discovery to one of the communication devices 104. The discovering master assignment process may be performed by the discovering master communication device 102 and/or by one or more of the nearby communication devices 104. The discovering master assignment process may rely on a resources analysis in which information on one or more resources, for example, energy, power, battery life, processing load, processing time, execution time and/or network availability is collected from the discovering master communication device 102 and/or one or more of the nearby communication devices 104 to identify a communication device which is currently the best candidate for the role of network discovery of the high resources consuming wireless network 110 with respect to availability of the one or more resources. The resources analysis may include computation of one or more energy and/or processing aspects for the discovering master communication device 102 and/or for each of the nearby communications device(s) 104. The resources analysis may include analysis of, for example, battery energy level, battery life expectancy, impact of enabling the high resources consuming wireless interface(s) on the battery life expectancy and/or impact of other tasks performed by each of the discovering master communication device 102 and/or the nearby communications device(s) 104 on the battery life expectancy. The resources analysis may further include analysis of network availability, for example, a valid communication package, a valid service provider package and/or sufficient network bandwidth for the discovering master communication device 102 and/or for each of the nearby communications device(s) 104. Following the resources analysis a candidate for the role of network discovery may be determined which may be assigned as a new discovering master communication device such as the discovering master communication device 102 or one of the nearby communications devices 104. In case the determined candidate for the role of network discovery is not the current discovering master communication device 102, the discovering master communication device 102 dynamically assigns the nearby communications device 104 which was determined to take the role of network discovery as a new discovering master communication device such as the discovering master communication device 102. The assignment is done through a master assignment message sent to the determined candidate over the low resources consuming communication link 120.

The discovering master communication device 102 may be the master of the low resources consuming communication link 120. Optionally, one of the other nearby communication devices 104 may be the master of the low resources consuming communication link 120. When configured as the master of the communication link 120 in case the role of network discovery is assigned to one of the nearby communication devices 104, the new discovering master communication device becomes the master on the low resources consuming communication link as well after the previous discovering master communication device has resigned mastership. Additionally and/or alternatively, the previous discovering master communication device may not resign mastership over the low resources consuming communication link 120 after it is no longer assigned as the discovering master communication device 102. The previous discovering master communication device which maintains mastership over the low resources consuming communication link 120 while the discovering master communication device 102 and the one or more nearby communication devices 104 are slave devices on the low resources consuming communication link 120. The previous discovering master communication device may perform as a coordinator between discovering master communication device 102 and the one or more nearby communication devices 104. The previous discovering master communication device may employ and/or execute a message distribution system and/or a software application which may support communicating with the discovering master communication device 102 to retrieve one or more messages concerning the network discovery session and distribute the message(s) to one or more of the nearby communication device(s) 104.

Optionally, one or more additional network-enabled nearby communication devices such as nearby communications device 104 may join the system 100 by pairing and/or connecting to the low resources consuming communication link 120 in order to participate in the network discovery session of the high resources consuming wireless network 110.

Optionally, in the event that the discovering master communication device 102 is not detected, not available and/or not properly responding on the low resources consuming communication link 120, a new discovering master communication device 102 is assigned. Assignment of the new discovering master communication device 102 may be done based on the resources analysis.

Optionally, following an indication of no coverage area for the high resources consuming wireless network 110, the discovering master communication device 102 turns off its high resources consuming wireless interface and does not try to initiate the network discovery session with the high resources consuming wireless network 110. The no coverage area indication may come from an indicating device which may be the discovering master communication device 102 and/or one or more of the nearby communications device(s) 104 which may use one or more of their capabilities, for example, sensory data and/or calendric data to assist the discovering master communication device 102 in the network discovery session.

Optionally, the network no coverage indication source is an input from one or more sensors, for example, a GPS sensor, an accelerometer sensor and/or a gyroscope sensor which may be accessible from the discovering master communication device 102 and/or from one or more of the nearby communication devices 104 assisting the discovering master communication device 102. The GPS sensor, for example, may indicate the current location is not within coverage of the high resources consuming wireless network 110. The accelerometer sensor and/or the gyroscope sensor may indicate a traveling speed which may be associated with, for example, driving a car and/or flying on an aircraft suggesting that the high resources consuming wireless network 110 may not be available. Network coverage information relating to the determined no coverage location may be retrieved from one or more remote locations such as, for example, a remote server and/or a remote database over the one or more high resources consuming wireless networks (while still in network coverage area) and/or from past experience relating to trying to discover the one or more high resources consuming wireless networks at the determined location in the past.

Optionally, the network no coverage indication source results from an analysis performed over calendric information available from one or more data records and/or software application residing on the discovering master communication device 102 and/or one or more of the nearby communication devices 104 assisting the discovering master communication device 102 in the network discovery session. The data records may include, for example, information relating to the location of the person associated with the one or more communication devices at a certain time and date, for example a calendar record and/or a calendar application. The calendar application, for example may include a record indicating that at a specific time the associated person will be travelling by bus suggesting that the high resources consuming wireless network 110 may not be available. Another example may that according to one or more calendar records every evening the associated person drives home from work on a route which was identified in the past as a no coverage area for the high resources consuming wireless network 110.

Optionally, the indication source for the network no coverage indication for a specific one of the one or more high resources consuming wireless networks 110 is received from the one or more remote locations over a different one or more of the high resources consuming wireless networks 110. The no coverage indication may be received by discovering master communication device 102 and/or by one or more of the nearby communication devices 104 which may use one or more of their integrated capabilities, for example, sensory data and/or calendric data to assist the discovering master communication device 102 in the network discovery session. For example, information of no Wi-Fi availability (no coverage) may be received by the discovering master communication device 102 and/or one or more of the nearby communication devices 104 over a cellular network, such as, for example, a GSM network, a CDMA network and/or an LTE network.

Figure 2:
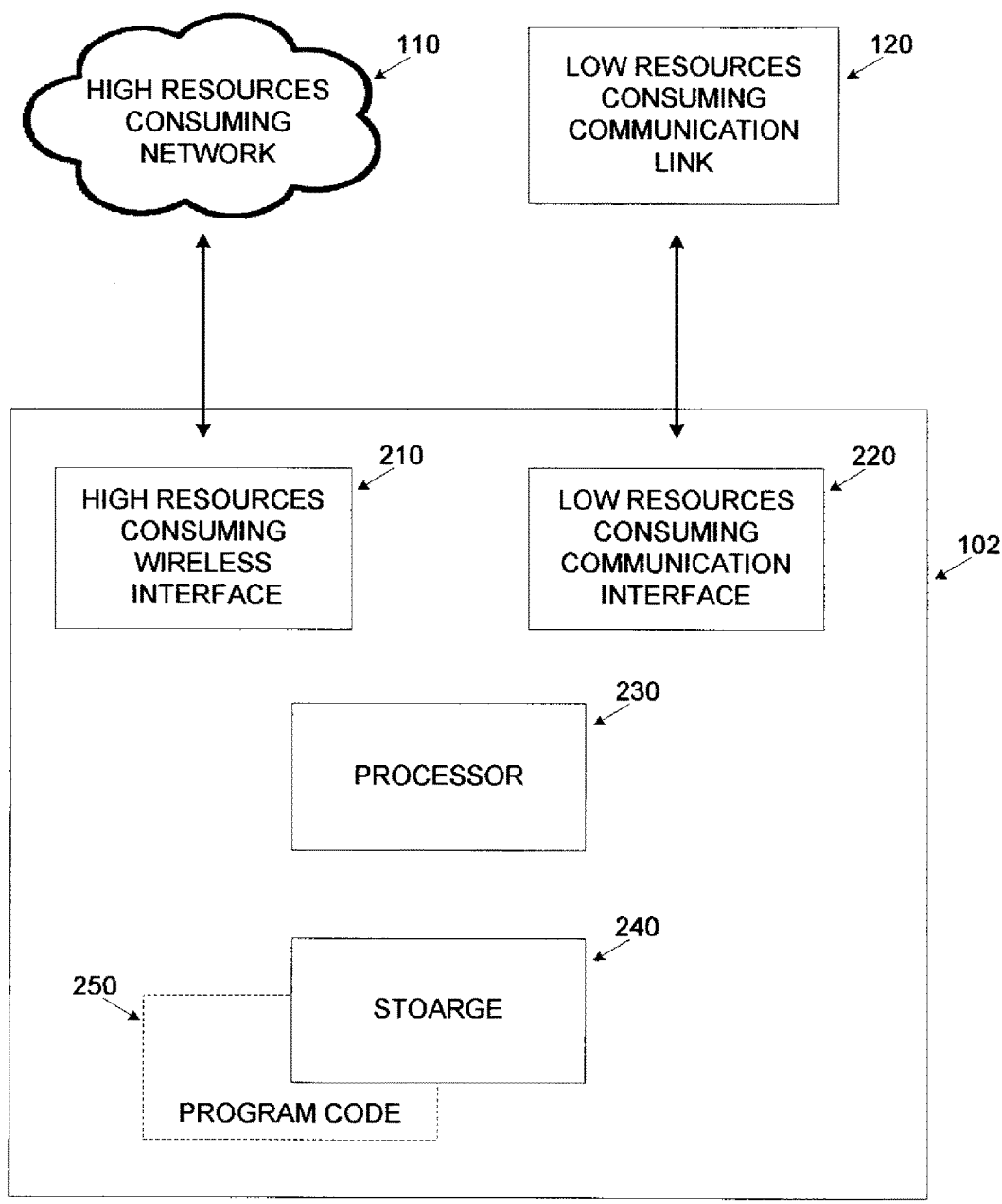
FIG. 2 is a schematic illustration of an exemplary discovering master communication device, according to some embodiments of the present invention.

Reference is now made to FIG. 2 which is a schematic illustration of an exemplary discovering master communication device, according to some embodiments of the present invention. An exemplary discovering master communication device such as the discovering master communication device 102 includes a first communication interface 210, a second communication interface 220, one or more processors 230 and a storage 240 which stores a program code 250. The first communication interface 210 is a high resources consuming wireless interface for connecting to a high resources consuming wireless network such as the high resources consuming wireless network 110. The second communication interface 220 is a low resources consuming communication interface for connecting to a low resources consuming communication link such as the low resources consuming communication link 120. The processor 220 is coupled to the first interface 210, to the second interface 220 and to the storage unit 240 for executing the program code 250. The processor 230 enables the first interface 210 and starts a network discovery session to discover a remote resource, for example, the high resources consuming wireless network 110 and/or one or more remote resources accessible over the such as the remote resources 115. In the event the remote resource is detected the processor 230 tries to establish a connection to the remote resource. Once the connection to the remote resource is established the processor 230 send an availability message to one or more nearby communication devices such as the nearby communication devices 104 (FIG. 1) (yes, reference is made to devices such as those described in FIG. 1) over the low resources consuming communication link 120 using the second interface 220.

In the event that a new discovering master communication device is assigned, for example following an resources analysis of the discovering master communication device 102 and the one or more nearby communication devices 104, the discovering master communication device 102 sends a master assignment message to the new discovering master communication device over the low resources consuming communication link 120 and resigns the role of being the discovering master communication device 102.

In some embodiments of the present invention, the discovering master communication device 102 performs as the master of the low resources consuming communication link 120. When the role of network discovery is assigned to one of the nearby communication devices 104, the new discovering master communication device becomes the master on the low resources consuming communication link after the discovering master communication device 102 resigns mastership.

In another embodiment of the present invention, there is no relation between the role of network discovery and mastership over the low resources consuming communication link 120. In case the discovering master communication device 102 is the master of the low resources consuming communication link 120 and a new discovering master communication device is assigned the discovering master communication device 102 may not resign mastership over the low resources consuming communication link 120 after it is no longer assigned as the discovering master communication device 102. The previous discovering master communication device may employ a message distribution system and/or application to receive messages from the discovering master communication device 102 and distribute them to the nearby communication device(s) 104.

Figure 3:
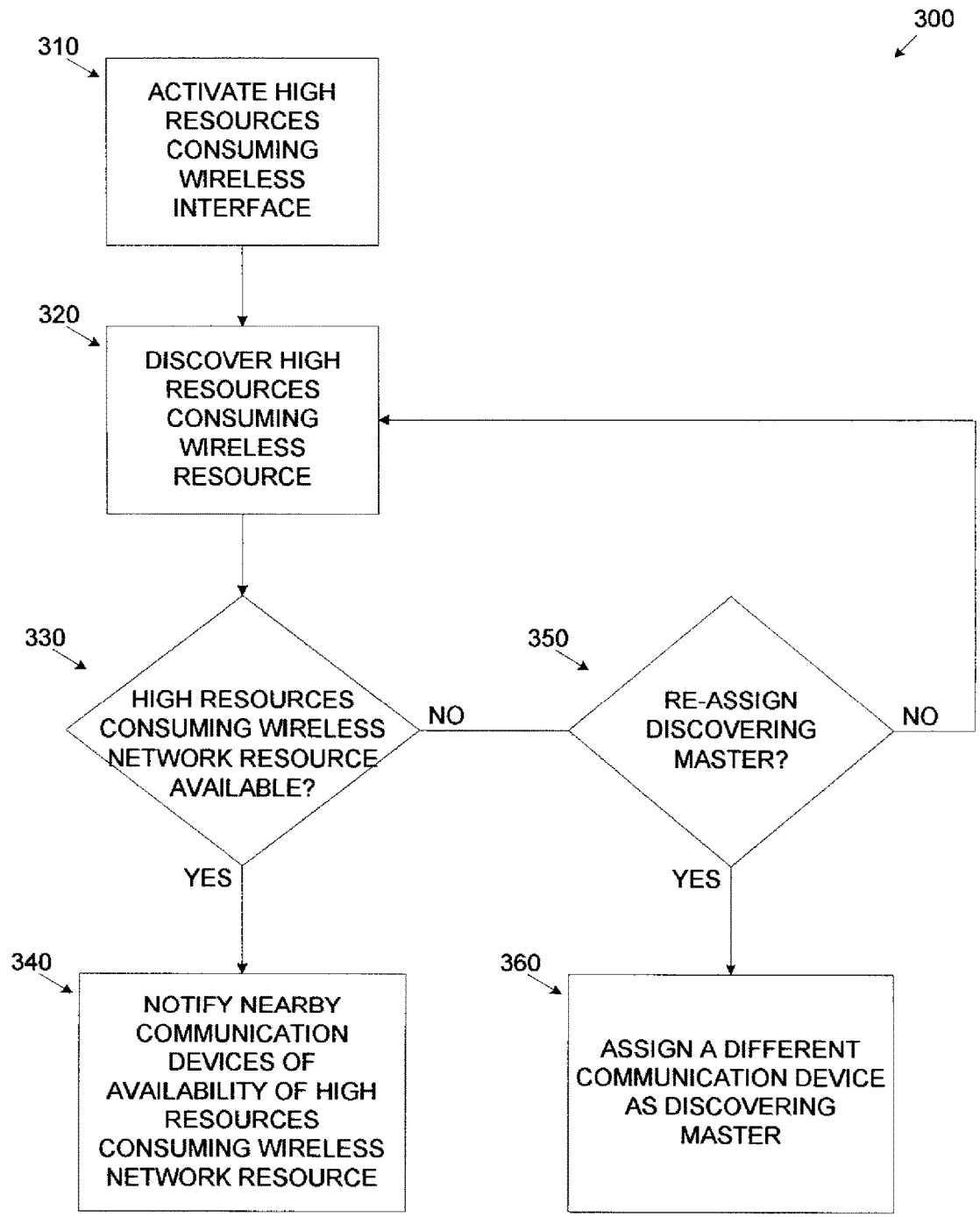
FIG. 3 is a flowchart of an exemplary process for optimizing discovery of a high resources consuming wireless network resource by dynamically assigning a discovering master communication device, according to some embodiments of the present invention.

Reference is now made to FIG. 3 which is flowchart of an exemplary process for optimizing discovery of a high resources consuming wireless network resource by dynamically assigning a discovering master communication device, according to some embodiments of the present invention. As shown a process 300 for optimizing discovery of a high resources consuming wireless network by dynamically assigning a discovering master communication device may be implemented through a system comprising two or more nearby network-enabled communication devices such as the system 100. The process 300 starts by a discovering master communication device such as the discovering master communication device 102 enabling a high resources consuming wireless interface such as the first interface 210.

As shown at 320, the discovering master communication device 102 initiates a discovery session to discover availability of a high resources consuming wireless network such as the high resources consuming wireless network 110 and/or one or more remote resources such as the remote resources 115. The discovering master communication device 102 may be assisted by one or more nearby communication devices such as the nearby communication devices 104 during the discovery session. The nearby communication devices 104 may assist the discovering master communication device 102 by accessing one or more capabilities used to identify availability of the high resources consuming wireless network 110 and/or the remote resources 115, for example, sensory data and/or calendric data. The sensory data may be available from one or more sensors accessible by one or more of the nearby communication devices 104, for example, GPS, accelerometer and/or gyroscope. The calendric data may be available from one or more calendric records available to one or more of the nearby communication devices 104, for example, calendar application, task management application and the likes.

As shown at 330 which is a decision point, the discovering master communication device 102 determines availability of a remote service. The remote service may be, for example, a high resources consuming wireless network such as the high resources consuming wireless network 110 and/or one or more remote resources such as the remote resources 115 based on the discovery process of 320. In case the remote service is available and a connection is successfully established, the process 300 branches to step 340. In case the remote service is not available and/or the discovering master communication device 102 could not establish a connection to the remote service the process 300 branches to step 350.

As shown at 340, in case the discovering master communication device 102 resolves remote service is available and accessible, the discovering master communication device 102 may send an availability message to the nearby communication devices 104 over a low resources consuming communication link such as the low resources consuming communication link 120. Following reception of the availability message, the one or more nearby communication devices 104 may enable their high resources consuming wireless interface to connect to the remote service.

As shown at 350 which another decision point, in case the remote service is not available and/or not accessible, a decision is taken whether to assign a different one of the nearby communication devices 104 as the discovering master communication device 102 or to leave the current the discovering master communication device as the discovering master communication device 102. The decision at 350 may be based on a resources analysis as described hereinabove. In case the discovering master communication device 102 is decided to maintain the role of network discovery the process branches back to 320.

As shown at 360, in case a candidate of the nearby communication device(s) 104 is determined to be assigned the network discovery role where the candidate is not the discovering master communication device 102, the discovering master communication device 102 sends a master assignment message to the determined candidate over the low resources consuming communication link 120. The determined candidate now becomes the discovering master communication device 102 and it carries out the network discovery session starting at 310.

Some embodiments of the present disclosure are provided through examples with reference to the accompanying drawings. However, this invention may be embodied in many different forms and should not be construed as limited to any specific structure or function presented herein.

By way of example, and not limitation, a Wi-Fi network may be considered a high resources consuming wireless network such as the high resources consuming wireless network 110 since the Wi-Fi network based on a fixed infrastructure may provide access to wide area networks such as, for example, a WAN and/or the internet.

Figure 4:
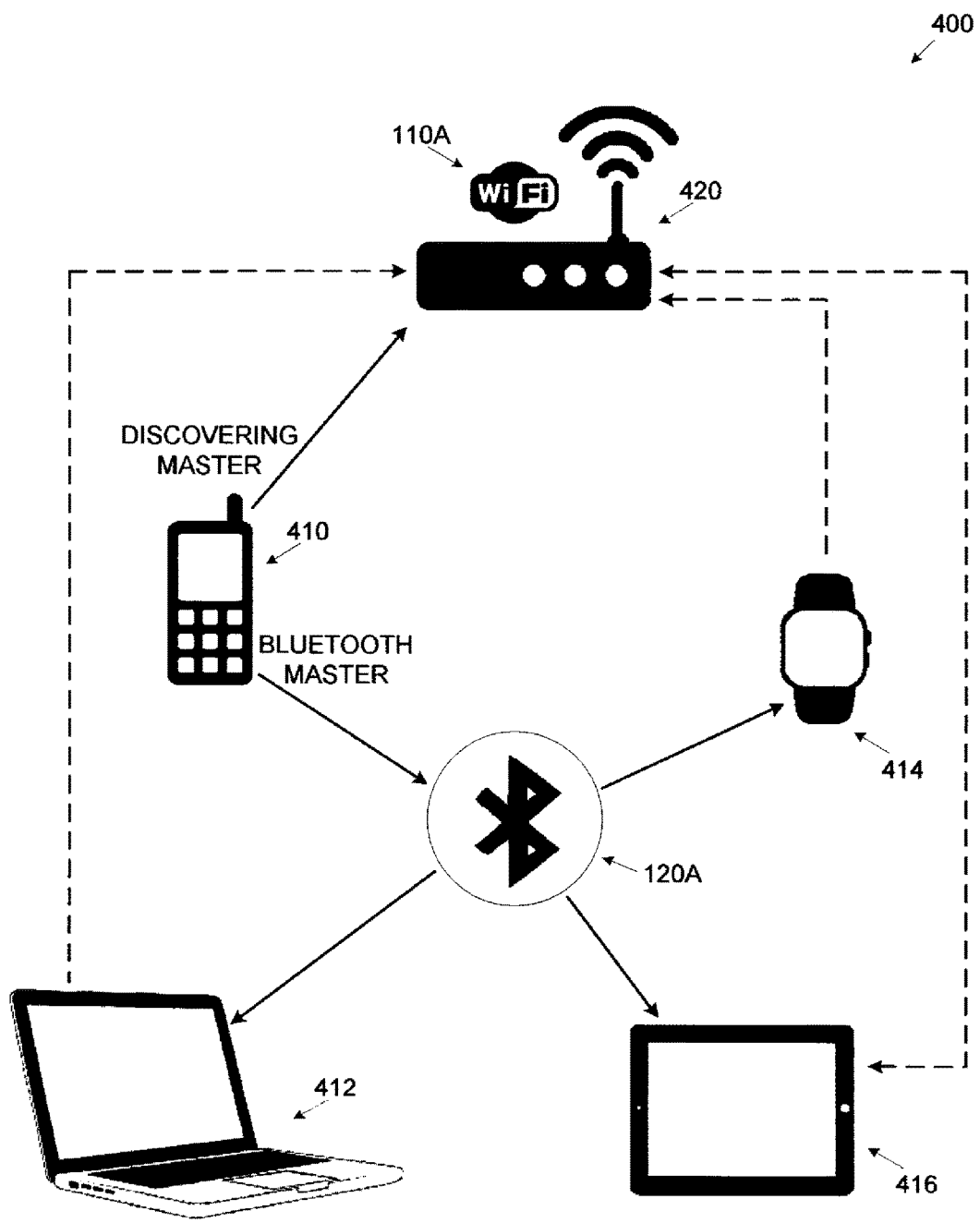
FIG. 4 is a schematic illustration of an exemplary system for optimizing discovery of an exemplary Wi-Fi network by a discovering master communication device, according to some embodiments of the present invention.

Reference is now made to FIG. 4 which is a schematic illustration of an exemplary system for optimizing discovery of an exemplary Wi-Fi network by a discovering master communication device, according to some embodiments of the present invention. A system 400 which is a private case example of a system such as the system 100 includes four network-enabled mobile communication devices, a smartphone 410, a laptop 412, a smartwatch 414 and a tablet 416. The mobile communication devices 410, 412, 414 and 416 are located in close proximity such as the nearby communication devices 104. The mobile communication devices 410, 412, 414 and 416 all support access to a Wi-Fi network 110A which is a private case example of the high resources consuming wireless network 110. The mobile communication devices 410, 412, 414 and 416 are capable of connecting to a Bluetooth link 120A which is a peer-to-peer communication link private case example of the low resources consuming communication link 120. Following a discovering master assignment process such as the process 300 the smartphone 410 is assigned as a discovering master communication device such as the discovering master communication device 102. One or more of the other mobile communication devices 412, 414 and 416 turn off their Wi-Fi transceivers in order to reduce their energy consumption to preserve battery life. In the exemplary system 400 the once the smartphone 410 is assigned as the discovering master communication device 102 it also becomes a master on the Bluetooth link 120A while one or more of the other mobile devices 412, 414 and 416 operate as slave devices. The smartphone 410 serving as the discovering master communication device 102 initiates a Wi-Fi discovery session and discovers the Wi-Fi network 110A which is available through a router 420 serving as a Wi-Fi access point. Following the successful discovery, the smartphone 410 tries to establish a connection with the router 420 to join to the Wi-Fi network 110A. After the Wi-Fi connection is set, the smartphone 410 sends an availability message to the nearby communication devices 412, 414 and 416 over the Bluetooth link 120A to inform them they may connect to the Wi-Fi network 110A. The nearby communication devices 412, 414 and 416 enable their Wi-Fi transceivers and try to establish a connection with the router 420 to join to the Wi-Fi network 110A.

Reference is now made to FIG. 5 which is a schematic illustration of an exemplary system for assigning a new discovering master communication device in an exemplary Wi-Fi network following a resources analysis, according to some embodiments of the present invention. A system 500 may be the same as the system 400 presented and described hereinabove in FIG. 4. At the event the connection to the Wi-Fi network 110A is lost a discovering master assignment process such as the process 300 may be initiated. The process 300 may be based on a resources analysis of one or more of the mobile communication devices 410, 412, 414 and/or 416 to identify a candidate to be assigned as a discovering master communication device such as the discovering master communication device 102 as described in step 350 of the process 300. The process 300 may result with assigning the laptop 412 as the discovering master communication device 102. As presented hereinabove for the system 400, in the exemplary system 500 once the laptop 412 is assigned as the discovering master communication device 102 it also becomes a master on the Bluetooth link 120A while the other mobile devices 410, 414 and 416 operate as slave devices. The laptop 412 initiates a network discovery session and the sequence is repeated as done by the system 400.

Alternatively, the smartphone 410 may remain the master on the Bluetooth link 120A with one or more of the other mobile devices 412, 414 and 416 operate as slave devices even after it is no longer assigned as the discovering master communication device 102 and the laptop 412 is the discovering master communication device 102. In such as configuration of the Bluetooth link 120A, the smartphone 410 will serve as a message distributing device where messages concerning discovery process of the Wi-Fi network 110A. The smartphone 410 may retrieve the message (s) from the laptop 412 and transmits them to one or more of the nearby communication devices 414 and/or 416.

Reference is now made to FIG. 6 which is a schematic illustration of an exemplary system for assigning a new discovering master communication device in an exemplary Wi-Fi network following unavailability of a discovering master communication device, according to some embodiments of the present invention. A system 600 may be the same as the system 400 presented and described hereinabove in FIG. 4. While a smartphone 410 is assigned as a discovering master communication device such as the discovering master communication device 102 it becomes unavailable and/or not properly responding on a low resources consuming communication link such as the Bluetooth link 120A. Following the loss of the smartphone 410 on the Bluetooth link 120A, a discovering master assignment process such as the process 300 may be initiated. The process 300 may be based on a resources analysis of one or more mobile communication devices 412, 414 and/or 416 to identify a candidate to be assigned as the discovering master communication device 102 as described in step 350 of the process 300. The process 300 may result with assigning the laptop 412 as the discovering master communication device 102. The laptop 412 initiates a network discovery session and the sequence is repeated as done by the system 400.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A discovering master communication device for discovering a high resources consuming wireless network resource in order to optimize resources consumption of a group of nearby communication devices, comprising:

a first communication interface for communicating with a plurality of high resources consuming wireless network resources over at least one high resources consuming wireless network;

a second communication interface connecting over one or more low resources consuming communication links to a plurality of nearby communication devices located within a range from said second communication interface;

a storage for storing a code;

at least one processor coupled to said first communication interface, said second communication interface and said storage to execute said code, said code comprising:

code instructions to activate said first communication interface to discover an availability of at least one of said plurality of high resources consuming wireless network resources by a communication over said at least one high resources consuming wireless network;

code instructions to inform at least one of said plurality of nearby communication devices about said availability of said at least one high resources consuming wireless network resource by sending an availability message using said second communication interface; and code instructions to assign one of said plurality of nearby communication devices as a new discovering master communication device based an outcome of an analysis indicating, for each of at least some of said plurality of nearby communication devices, an availability of a communication device resource selected from a group consisting of: a battery energy, a battery power, a battery life, a processing load, a processing time, an execution time, a valid communication package, a valid service provider package, a sufficient network bandwidth;

wherein for a similar communication session, resources consumption of said second communication interface is lower than resources consumption of said first communication interface.

2. The discovering master communication device of claim 1, wherein said code further comprising code instructions to deactivate said first communication interface of said discovering master communication device following a no coverage indication that said discovering master communication device is located in a no coverage area of said at least one high resources consuming wireless network.

3. The discovering master communication device of claim 2, further comprising said no coverage indication originates from at least one of a plurality of sensors accessible by at least one of: said discovering master communication device and said at least one nearby communication device assisting said discovering master communication device, said at least one sensor is a member of a group consisting of: a global positioning system (GPS) sensor, an accelerometer sensor and a gyroscope sensor.

4. The discovering master communication device of claim 2, wherein said no coverage indication is originated from an analysis of a plurality of calendric information records available to at least one of said discovering master communication device and at least one of said plurality of nearby communication devices.

5. The discovering master communication device of claim 2, wherein said no coverage indication is originated from another one of said plurality of high resources consuming wireless networks.

6. The discovering master communication device of claim 1, wherein said new discovering master communication device is assigned following a detection that said discovering master communication device is unavailable over said low resources consuming communication link.

7. The discovering master communication device of claim 1, wherein said code instructions to inform at least one of said plurality of nearby communication devices comprises code instructions to inform at least some of said plurality of nearby communication devices by sending a plurality of availability messages using said second communication interface.

8. A computer implemented method for discovering a high resources consuming wireless network resource in order to optimize resources consumption of a group of nearby communication devices, comprising:

using an application code executed on a discovering master communication device for:

activating a first communication interface of said discovering master communication device to discover an availability of at least one of a plurality of high resources consuming wireless network resources using a communication conducted over at least one high resources consuming wireless network;

sending an availability message to at least one of a plurality of nearby communication devices which includes an interface similar to said first communication interface to inform said at least one nearby communication device of said availability of said at least one high resources consuming wireless network resource, said availability message is sent over a second communication interface of said discovering master communication device while said at least one nearby communication device is located within range of said second communication interface; and assigning one of said plurality of nearby communication devices as a new discovering master communication device based an outcome of an analysis indicating, for each of at least some of said plurality of nearby communication devices, an availability of a communication device resource selected from a group consisting of: a battery energy, a battery power, a battery life, a processing load, a processing time, an execution time, a valid communication package, a valid service provider package, a sufficient network bandwidth;

wherein for a similar communication session, resources consumption of said second communication interface is lower than resources consumption of said first communication interface.

9. The computer implemented method of claim 8, wherein said at least one nearby communication device activates a deactivated said interface similar to said first communication interface thereof following reception of said availability message in order to connect to said at least one high resources consuming wireless network.

10. The computer implemented method of claim 8, wherein said application code further comprising code instructions to deactivate said first communication interface of said discovering master communication device following a no coverage indication that said discovering master communication device is located in a no coverage area of said at least one high resources consuming wireless network.

11. The computer implemented method of claim 10, wherein said no coverage indication is originated from a member selected from a group consisting of: said discovering master communication device and at least one of said plurality of nearby communication devices.

12. The computer implemented method of claim 8, wherein said new discovering master communication device is assigned following a detection that said discovering master communication device is unavailable over said second communication interface.

13. A software program product for discovering a high resources consuming wireless network resource in order to optimize resources consumption of a group of nearby communication devices, comprising:

a non-transitory computer readable storage medium;

first program instructions to activate a first communication interface of a discovering master communication device to discover an availability of at least one of a plurality of high resources consuming wireless network resources using a communication conducted over at least one high resources consuming wireless network;

second program instructions to send an availability message to at least one of a plurality of nearby communication devices which includes an interface similar to said first communication interface to inform said at least one nearby communication device of said availability of said at least one high resources consuming wireless network resource, said availability message is sent over a second communication interface of said discovering master communication device while said at least one nearby communication device is located within range of said second communication interface; and third program instructions to assign one of said plurality of nearby communication devices as a new discovering master communication device based an outcome of an analysis indicating, for each of at least some of said plurality of nearby communication devices, an availability of a communication device resource selected from a group consisting of: a battery energy, a battery power, a battery life, a processing load, a processing time, an execution time, a valid communication package, a valid service provider package, a sufficient network bandwidth;

wherein for a similar communication session resources consumption of said second communication interface is lower than resources consumption of said first communication interface;

wherein said first, second and third program instructions are executed by at least one computerized processor from said non-transitory computer readable storage medium.

14. The software program product of claim 13, wherein said at least one nearby communication device activates a deactivated said interface similar to said first communication interface thereof following a reception of said availability message in order to connect to said at least one high resources consuming wireless network.

15. The software program product of claim 13, further comprising fifth program instructions to deactivate said first communication interface of said discovering master communication device following a no coverage indication that said discovering master communication device is located in a no coverage area of said at least one of said plurality of high resources consuming wireless networks;

wherein said fifth program instructions are executed by said at least one computerized processor from said non-transitory computer readable storage medium.

16. The software program product of claim 15, wherein said no coverage indication is originated from at least one indicating device selected from a group consisting of: said discovering master communication device and said at least one nearby communication device assisting said discovering master communication device, said at least one indicating device having a member selected from a group consisting of: at least one of a plurality of sensors, calendric information analysis and an indication from another one of said plurality of high resources consuming wireless networks.

17. The software program product of claim 13, wherein said new discovering master communication device is assigned following a detection that said discovering master communication device is unavailable over said second communication interface.

* * * * *